2,985,537
ROSIN SIZE HAVING IMPROVED CRYSTALLIZATION CHARACTERISTICS

Spencer H. Watkins, Wilmington, Del., assignor to Hercules Powder Company, Wilmington, Del., a corporation of Delaware
No Drawing. Filed July 8, 1955, Ser. No. 520,898
5 Claims. (Cl. 106—238)

This invention relates to the manufacture of rosin size compositions having improved stability against crystallization.

The general procedure for preparing rosin size consists in saponifying molten rosin with an aqueous solution of an alkali such as sodium carbonate or sodium hydroxide. The quantity of alkali used is dependent upon the free rosin content desired in the size. In general, this will vary from about 9–16% by weight alkali based on the weight of the rosin, the higher percentages resulting in saponification of most of the rosin with consequent low free rosin content and the lower percentages resulting in saponification of lesser amounts of rosin with consequent high free rosin content.

It is well known that paste rosin sizes of constant total solids content and dilute emulsions prepared therefrom show, with increasing free rosin content, increasing tendency toward crystallization in storage. Thus, in the preparation of paper sizes from rosin, in order to avoid crystallization in the size, it is usually necessary to keep the solids content at or below 70% and to observe a maximum limitation on the acid number of about 30. However, by doing this one encounters another problem, namely, gelation of the size. The gelation problem can be avoided only by raising the solids content and acid number but this, unfortunately, sets the stage for crystallization.

In an effort to solve the problem it has been proposed to add to the size a crystallization inhibitor, such as formaldehyde, condensation products of formaldehyde, and the like, and while this has been effective under some conditions, it has been found unsatisfactory for the prevention of crystallization of paste and liquid sizes of acid number greater than about 15 (free rosin content greater than about 9%) when said samples are stored at 60° C.

It has now been found that if a small amount of formaldehyde, or a formaldehyde yielding material, is added to the rosin prior to size formation, and the mixture heated at a temperature above 100° C. in the presence of an acid catalyst, a size made from the resulting rosin has very little tendency to crystallize under conditions which do not promote gelation of the size, i.e., at a solids content in excess of 70% and an acid number in excess of 30. The amount of acid used is very small.

In preparing the novel rosin size compositions of the invention, any suitable rosin material such as, for example, gum rosin, wood rosin, tall oil rosin, and specially refined and/or treated rosin such as partially hydrogenated rosin, and so on, is reacted with 0.5% to 4% by weight, based on the weight of rosin, of formaldehyde, or a formaldehyde yielding material, in the presence of an acid catalyst at a temperature between about 100° C. and 200° C. for a period of time from about 10 minutes to about 4 hours. The resulting reaction mixture containing the rosin-formaldehyde condensation product is then saponified with alkali and formed into size in the usual manner.

Having described the invention generally, the following examples are given to illustrate specific embodiments thereof. Parts given are parts by weight unless otherwise specified.

EXAMPLES 1–12

The following procedure was utilized in preparing and testing the sizing compositions of Examples 1–12, except that in Examples 1, 6 and 10 the rosin material was not reacted with formaldehyde prior to size formation and in Examples 1, 2, 6 and 10 no acid catalyst was used.

Six hundred parts of N wood rosin was melted and brought to a temperature of 135–145° C. in a reaction vessel. A quantity (0.1% based on the weight of the rosin) of concentrated sulfuric acid was then added, followed by addition of the desired quantity of formaldehyde which was controlled by means of a dropping funnel fitted to the reaction vessel. The formaldehyde was added in 10–20 drop portions at approximately one-minute intervals during which the temperature of the reaction mixture fell to 115–125° C. After the formaldehyde addition was completed, the temperature was raised to 175° C. and held at this point until the removal of water added and formed in the reaction was complete. The reacted rosin was then poured into a tray under a blanket of carbon dioxide to solidify.

To a 200-g. sample of the reacted rosin, melted in a beaker on a hot plate, a hot aqueous solution of 18.1 parts of sodium hydroxide was added while stirring by hand. The mixture was adjusted to 70% solids by addition of sufficient water and stirred to a smooth paste. A representative one-ounce sample was removed, seeded with rosin size crystals, and stored in a tightly capped bottle at 60° C. The rate and extent of crystallization was followed by microscopic examination of the seeded sample, at alternate three- and four-day intervals for a period of six weeks or until the size had crystallized, whichever time was the shorter. The results are set forth in Table 1, the degree of crystallization being indicated by the numerals 1 to 5, the numeral 1 denoting no crystallization, the numeral 5 substantially complete crystallization, and the numerals 2, 3 and 4 increasing degrees of crystallization between the extremes represented by the numerals 1 and 5.

The crystallization tendencies of aqueous emulsions of the formulated paste sizes were also evaluated in each case as follows. A 21.4 part sample of the paste size was emulsified and adjusted to 3% solids with water. A 16-ounce sample of the emulsion was seeded with rosin size emulsion crystals and stored at 60° C. for 24 hours. The degree of crystallization was determined by comparison with previously established standards. Only those seeded emulsions which showed no crystal growth after 24 hours incubation at 60° C. were considered satisfactory. The results of these tests are also shown in Table 1.

Table 1

| Ex. No. | Rosin | | Size (A. N. 35 Percent Free Rosin 21.5, T. S. 70, Except as noted) Crystallization, Seeded | | |
|---|---|---|---|---|---|
| | Percent HCHO Added | 0.1% Parts of Conc. H₂SO₄ Added for Catalysis | 3% Emulsion [1] | Paste | |
| | | | | Degree | Days |
| N-Wood Rosin | | | | | |
| 1 | 0 | 0 | F | 5 | 23 |
| 2 | 1.0 | 0 | P | 5 | 22 |
| 3 | 1.0 | 1 | P | 3 | 42 |
| 4 | 1.5 | 1 | P | 1 | 42 |
| 5 | 2.0 | 1 | P | 1 | 42 |
| Tall Oil Rosin (A. N. 25, T. S. 70 Percent Free Rosin 15.5) | | | | | |
| 6 | 0 | 0 | P | 5 | 25 |
| 7 | 0.5 | 1 | P | 3–4 | 42 |
| 8 | 1.0 | 1 | P | 3 | 42 |
| 9 | 2.0 | 1 | P | 1 | 42 |
| Gum Rosin (A. N. 27, T. S. 75, Percent Free Rosin 16.5) | | | | | |
| 10 | 0 | 0 | F | 5 | 8 |
| 11 | 0.5 | 1 | P | 1 | 42 |
| 12 | 1.0 | 1 | P | 1 | 42 |

[1] F=failed, P=passed. Only those emulsions which showed no crystal growth are considered passable.

The process of the invention is also applicable in the preparation of maleic anhydride-fortified sizes from formaldehyde treated rosins and rosin-maleic anhydride adducts as illustrated by the following examples.

EXAMPLES 13–22

In Examples 13 to 19 inclusive a rosin-maleic anhydride adduct was prepared by reacting 600 parts of N wood rosin with 4% by weight (based on the weight of the product) of maleic anhydride. The resulting product was then reacted with formaldehyde (except Examples 13 and 17) and formed into size following the procedure set forth in connection with Examples 1–12. In Examples 13 and 17, the rosin-maleic anhydride adduct was not reacted with formaldehyde prior to being formed into size.

In Examples 21 and 22 the rosin material was first reacted with formaldehyde in accordance with the procedure of Examples 1–12. The resulting product was then reacted with maleic anhydride to form the adduct which was then saponified and formed into size in the usual manner. In Example 20 the rosin-maleic anhydride adduct was formed from rosin material which had not been reacted with formaldehyde and the resulting product then saponified and formed into size in the usual manner. The results are set forth in Table 2 below.

*Table 2*

MALEIC ANHYDRIDE FORTIFIED SIZES FROM FORMALDEHYDE TREATED ROSINS AND ADDUCTS

| Ex. No. | Rosin | | Size Crystallization, Seeded | | |
|---|---|---|---|---|---|
| | Percent HCHO Added | 0.1% Parts of Conc. H₂SO₄ Added for Catalysis | 3% Emulsion¹ | Paste | |
| | | | | Degree | Days |
| A. ADDUCT PREPARED AND TREATED WITH FORMALDEHYDE | | | | | |
| N-Wood Rosin (Avail. Acidity 35, T.S. 70) | | | | | |
| 13 | 0 | 1 | F | 5 | 15 |
| 14 | 0.5 | 1 | P | 3 | 43 |
| 15 | 1.0 | 1 | P | 1 | 43 |
| 16 | 1.5 | 1 | P | 1 | 43 |
| Gum Rosin (Avail. Acidity 30–35, T.S. 75) | | | | | |
| 17 | 0 | 1 | F | 5 | 21 |
| 18 | 0.5 | 1 | P | 1 | 42 |
| 19 | 1.0 | 1 | P | 1 | 42 |
| B. ADDUCT PREPARED FROM FORMALDEHYDE TREATED ROSIN | | | | | |
| N-Wood Rosin (Avail. Acidity 30–35, T.S. 70) | | | | | |
| 20 | 0 | 1 | F | 5 | 15 |
| 21 | 0.5 | 1 | P | 4 | 43 |
| 22 | 1.0 | 1 | P | 1 | 43 |

¹ F=failed, P=passed. Only those emulsions which showed no crystal growth are considered passable.

It will be apparent from the examples that substantial improvement in stability against crystallization of rosin sizes is obtainable if the rosin material is first reacted with formaldehyde in the presence of an acid catalyst at temperatures above 100° C. In the case of tall oil rosin and gum rosin, as well as the maleic anhydride adducts prepared from wood rosin, gum rosin and formaldehyde treated wood rosin, substantial improvement is obtained utilizing as little as 0.5% formaldehyde and 0.1% concentrated sulfuric acid, based on the weight of the rosin. Somewhat more formaldehyde is required in the case of sizes made from N wood rosin. In general, it may be stated that improved results are obtained utilizing from about 0.5% up to about 4% formaldehyde based on the weight of the rosin. Within this range optimum results are obtained utilizing from about 1% to about 2% formaldehyde, based on the rosin. This, therefore, is the preferred range.

The effect of the acid catalyst on stability against crystallization in paste sizes is clearly demonstrated in one instance by a comparison of Examples 1, 2 and 3. Thus, the use of 1% formaldehyde and no catalyst in Example 2 gave no improvement in stability against crystallization of the resulting size over the use of no formaldehyde and no catalyst of Example 1. However, when Example 2 is modified by the use of 0.1% concentrated sulfuric acid as catalyst, as in Example 3, the stability of the resulting size is substantially increased. A further improvement is obtained when the amount of formaldehyde is increased as in Examples 4 and 5.

In general the amount of acid catalyst employed may vary from about 0.05% to about 1%. However, for optimum results it is preferred to utilize from about 0.1% to about 0.5% catalyst based on the weight of the rosin. The preferred catalyst for the purpose is sulfuric acid, but other catalysts such as hydrochloric, phosphoric and similar inorganic acids, as well as organic acids, such as p-toluenesulfonic acid, acetic acid, and so on, are also suitable. The sulfuric acid catalyst is preferably utilized in concentrated form.

The formaldehyde may be used as such or in any form which in the presence of acid and heat will yield free formaldehyde such as paraformaldehyde, methylal, and so on.

The rosin material which can be employed in preparing sizes in accordance with the invention includes gum rosin, wood rosin, tall oil rosins, and the like. It may also include specially refined and/or treated rosins such as heat treated rosin, stabilized rosin, such as disproportionated rosin, partially hydrogenated or partially dehydrogenated rosin, polymerized or partially polymerized rosin, and so on. Hence, the term "rosin material" as used in the specification and claims is intended to cover any of the above-named materials.

In a preferred method of preparing rosin sizes in accordance with the invention, the rosin to be used is first melted, brought to a temperature between about 135° C. and 145° C., and held below 150° C. while a catalytic amount of concentrated sulfuric acid (about 0.1% based on the weight of rosin taken) is slowly added. Introduction of the desired quantity of formaldehyde is begun immediately, either beneath or upon the surface of the rosin. In the latter mode of addition, intimate contact between the reactants is achieved by vigorous stirring. After all of the formaldehyde has been added, the temperature of the treated rosin is raised to about 170–180° C. and held at this temperature for about one hour to complete the reaction. The treated rosin is then ready for conversion to the size, which may be accomplished in the manner described in the examples or in any conventional manner.

The process of the invention permits the preparation of rosin sizes stabilized against crystallization in both the paste and dilute emulsion (3% total solids) forms even when seeded and held in storage at 60° C. The process of the invention is also applicable to the preparation of maleic anhydride-fortified sizes, the reaction of the rosin material with formaldehyde being carried out either before or after it is reacted with maleic anhydride. Thus, the maleic anhydride adduct of N wood rosin or gum rosin may be reacted with formaldehyde under the conditions herein stated or the N wood rosin or gum rosin may first be reacted with formaldehyde and the maleic anhydride adduct then prepared from the formaldehyde treated rosin.

While preferred embodiments of the invention have been described herein, the invention is not to be construed as limited thereby except as the same may be included in the following claims.

What I claim and desire to protect by Letters Patent is:
1. A paste rosin size having improved stability against crystallization obtained by (1) reacting rosin with from about 0.5 percent to about 4 percent by weight, based on the weight of rosin, of a material selected from the group consisting of formaldehyde and paraformaldehyde in the presence of an acid catalyst at temperatures above about 100° C. and then partially neutralizing the resulting product with aqueous alkali.

2. A paste rosin size in accordance with claim 1 wherein the reaction of the rosin with the formaldehyde is carried out in the presence of from about 0.05 percent to about 1 percent by weight, based on the weight of rosin, of concentrated sulfuric acid.

3. A paste rosin size in accordance with claim 1 wherein the reaction of the rosin with the formaldehyde is carried out in the presence of from about 0.05 percent to about 1 percent by weight, based on the weight of rosin, of p-toluene sulfonic acid.

4. A paste rosin size having improved stability against crystallization and being the product obtained by (1) reacting rosin with maleic anhydride to form an adduct of rosin and maleic anhydride in the rosin, (2) reacting the resulting mixture with from about 0.5 percent to about 4 percent by weight, based on the weight of rosin, of formaldehyde in the presence of from about 0.05 percent to about 1 percent by weight, based on the weight of rosin, of an acid catalyst at a temperature from about 100° C. to about 200° C. and for a period of time from about 10 minutes to about 4 hours, and then (3) partially neutralizing the resulting product with aqueous alkali.

5. A paste rosin size having improved stability against crystallization and being the product obtained by (1) reacting rosin with from about 0.5 percent to about 4 percent by weight, based on the weight of rosin, of formaldehyde in the presence of from about 0.05 percent to about 1 percent by weight, based on the weight of rosin, of an acid catalyst at a temperature from about 100° C. to about 200° C. and for a period of time from about 10 minutes to about 4 hours, (2) reacting the resulting reaction product with maleic anhydride and then (3) partially neutralizing the resulting product with aqueous alkali.

References Cited in the file of this patent
UNITED STATES PATENTS

| | | |
|---|---|---|
| 1,243,312 | Low | Oct. 16, 1917 |
| 2,084,213 | Osterhof | June 15, 1937 |
| 2,108,928 | Rummelsburg | Feb. 22, 1938 |
| 2,306,281 | Rust | Dec. 22, 1942 |
| 2,311,781 | Scrutchfield | Feb. 23, 1943 |
| 2,320,795 | Pickett | June 1, 1943 |
| 2,572,071 | St. Clair et al. | Oct. 23, 1951 |